25981

Jan. 29, 1963 G. J. BAUDHUIN 3,075,603
VEHICLE STEERING SYSTEM
Filed June 29, 1959 5 Sheets-Sheet 1

Inventor
George J. Baudhuin
By McCanna, Morsbach & Pillote
Atty's

Jan. 29, 1963   G. J. BAUDHUIN   3,075,603
VEHICLE STEERING SYSTEM
Filed June 29, 1959   5 Sheets-Sheet 2

Inventor
George J. Baudhuin
By McCanna, Morsbach & Pillote
Atty's

Jan. 29, 1963  G. J. BAUDHUIN  3,075,603
VEHICLE STEERING SYSTEM
Filed June 29, 1959   5 Sheets-Sheet 3

Inventor
George J. Baudhuin
By McCanna, Morsbach & Pillote
Atty's

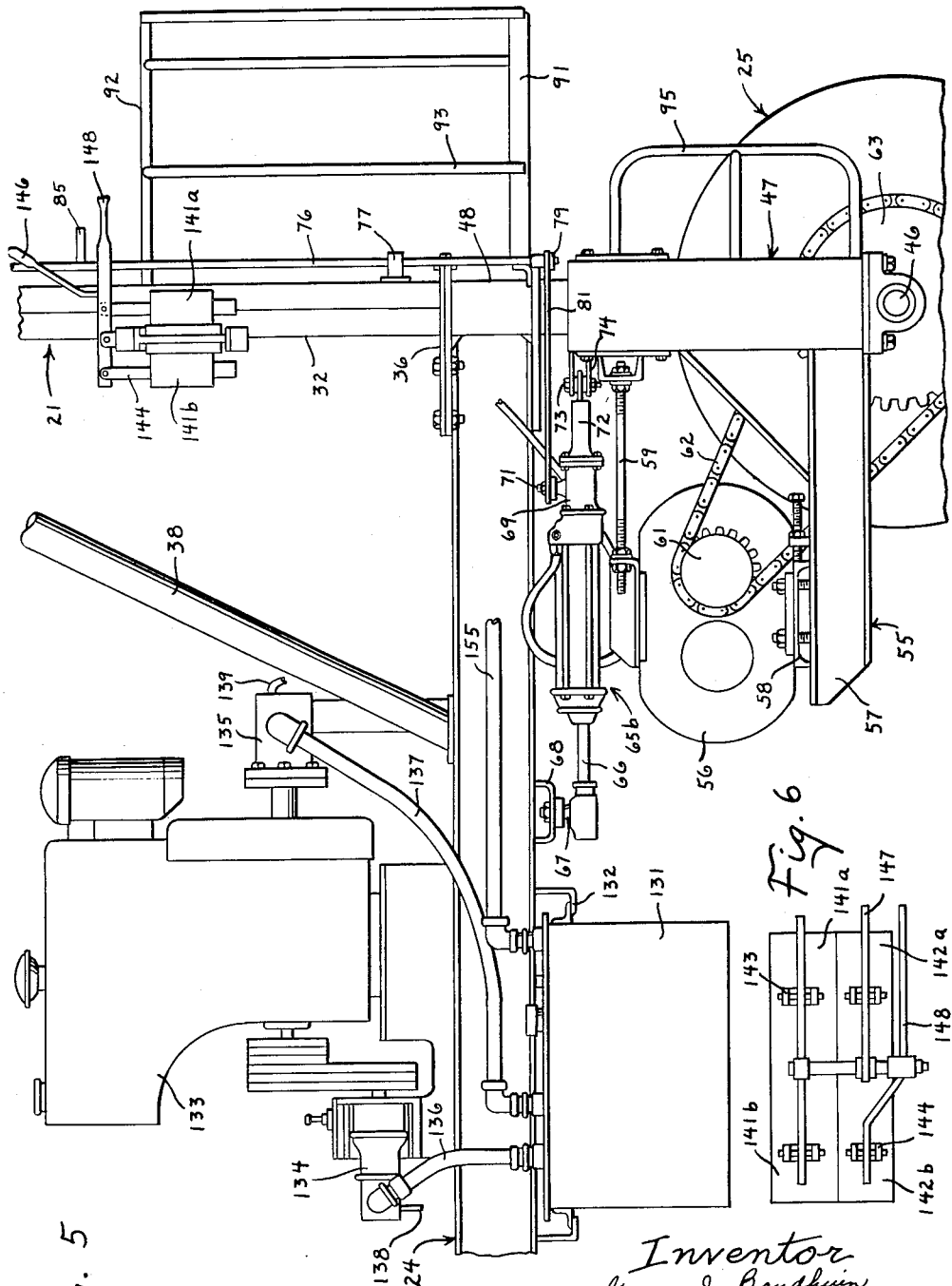

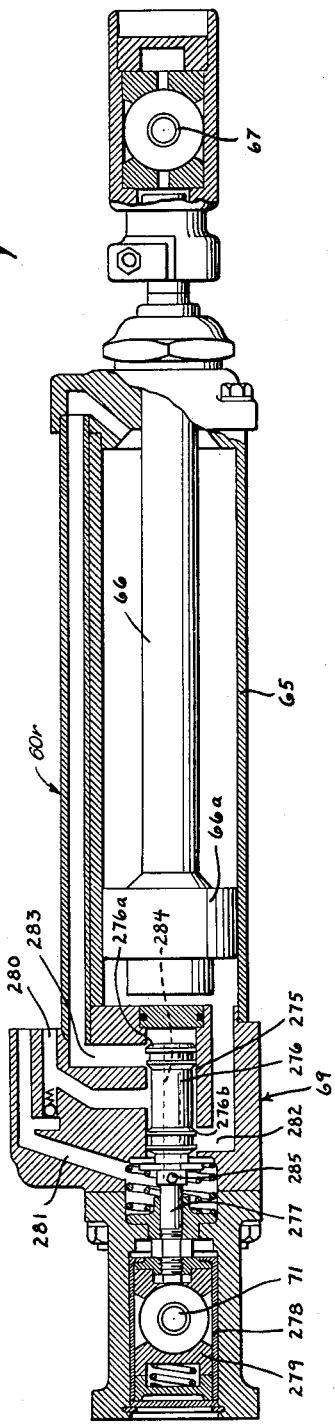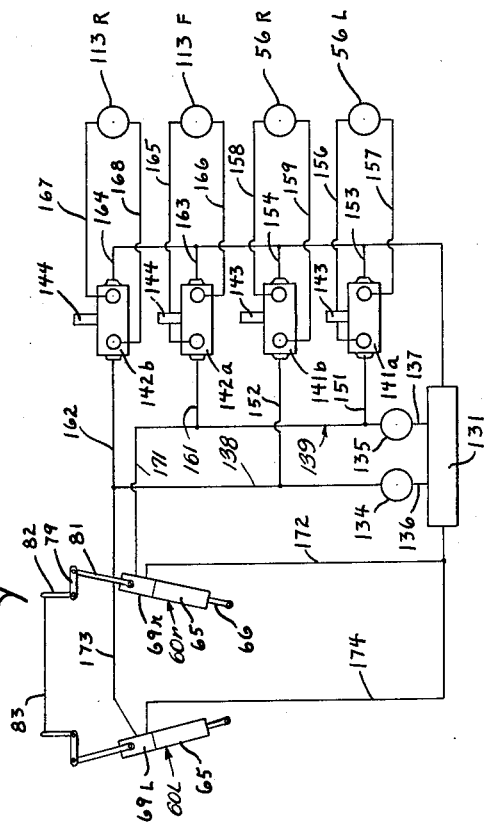

United States Patent Office 3,075,603
Patented Jan. 29, 1963

3,075,603
VEHICLE STEERING SYSTEM
George J. Baudhuin, Sturgeon Bay, Wis., assignor to Drott Manufacturing Corporation, Milwaukee, Wis., a corporation of Wisconsin
Filed June 29, 1959, Ser. No. 823,766
8 Claims. (Cl. 180—79.2)

This invention relates to improvements in vehicle steering apparatus and particularly to an hydraulic steering apparatus for use on a straddle type vehicle.

An important object of this invention is to provide an hydraulically operated steering apparatus for use on straddle type vehicles, which apparatus has a fluid operator for each steering wheel and an improved arrangement for controlling the operation at relatively opposite sides of the vehicle to effect turning of the steering wheels in controlled relation to each other without obstructing the open central span of such vehicles.

Another object of this invention is to provide an hydraulic steering apparatus having a separate fluid operator for each steering wheel arranged to turn the respective steering wheel through a greater angle when the operators are moved in one direction from a neutral position than when the operators are moved a corresponding distance in the other direction from the neutral position, to thereby turn the wheel at the inside of the turn through a greater angle than the wheel at the outside, and means for controlling the fluid operators at relatively opposite sides of the vehicle to simultaneously effect corresponding movement of both operators in relatively opposite directions.

A more particular object of this invention is to provide an hydraulic steering apparatus having an hydraulic steering booster at each side of the vehicle for turning a respective steering wheel, and a linkage operatively interconnecting the control valves of the boosters to effect turning of the wheels in controlled relation to each other.

Yet another object of this invention is to provide an hydraulic steering apparatus having a manual valve operating lever mounted for swinging movement in a generally horizontal plane and which is connected to the control valves for the steering wheel operators in such a manner that the angular position of the manual operating lever is correlative with the angular position of the vehicle wheels.

These, together with various ancillary objects and advantages of this invention wil be more readily appreciated as the same becomes better understood by reference to the following detailed description when taken in connection with the accompanying drawings wherein:

FIG. 5 is an enlarged fragmentary side elevational view of the vehicle and illustrating the front wheel drive and steering arrangement;

FIG. 6 is a diagrammatic view illustrating the arrangement of the hydraulic control operating levers;

FIG. 7 is a diagrammatic sectional view of one of the steering boosters showing the booster control valve in its neutral position; and FIG. 8 is a schematic diagram illustrating the hydraulic control circuit for the mobile lift.

Figure 1:
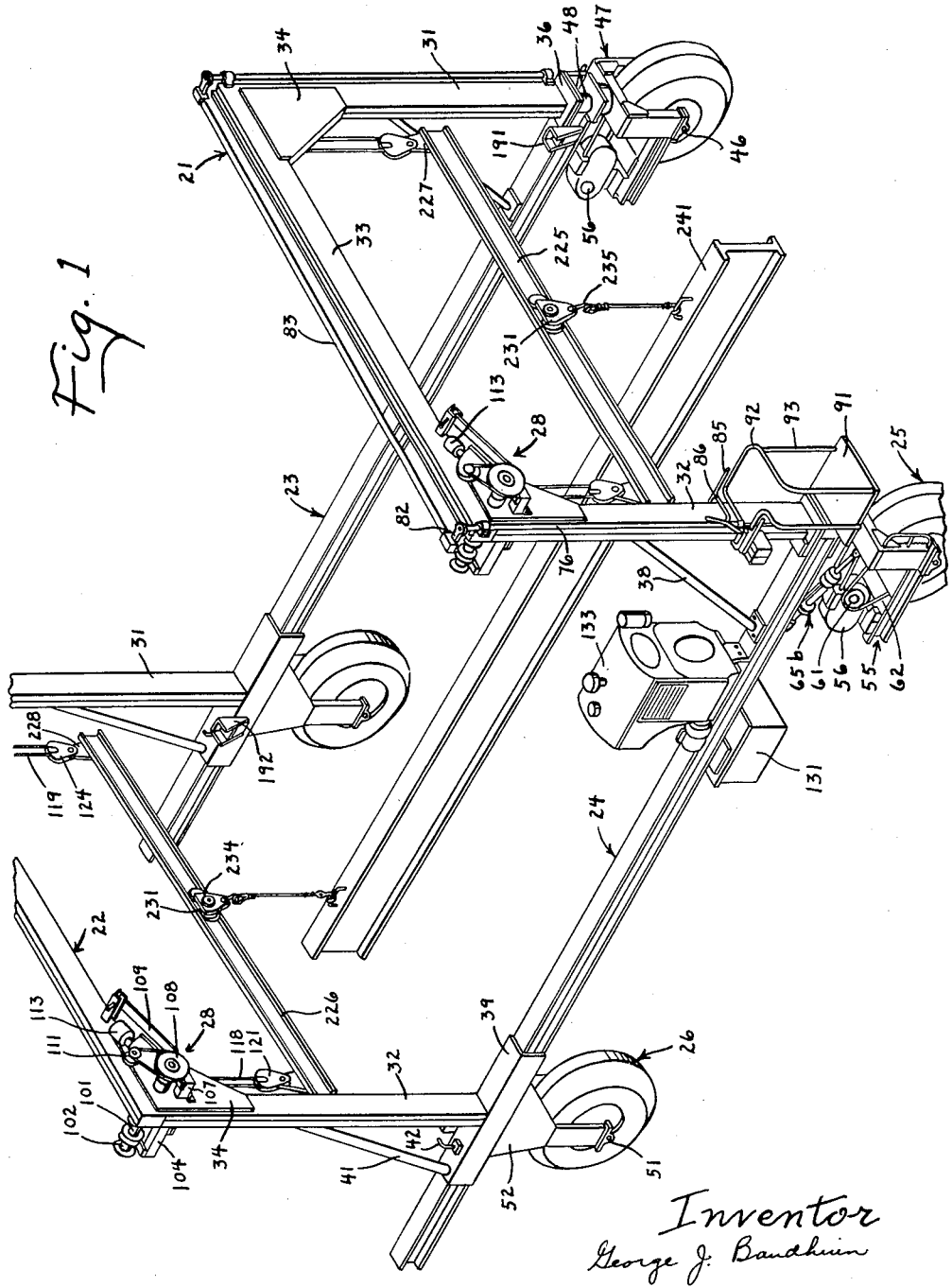
FIGURE 1 is a perspective view of a straddle type vehicle having the steering apparatus of the present invention mounted thereon.

This application is a continuation-in-part of my copending application Serial No. 766,086, filed October 8, 1958, now Patent #2,909,298 and relates to the hydraulic steering system for the vehicle.

In general, the straddle type vehicle or mobile lift includes front and rear U-shaped frames designated by the numerals 21 and 22 which are interconnected at their lower ends by spaced side beams 23 and 24. The lift is supported by pairs of front and rear wheels 25 and 26 and provision is made for both driving and steering the front wheels of the lift to provide a readily maneuverable self-propelled vehicle. The frames and side beams define an arch type structure for receiving the objects to be lifted and transported, and a hoist apparatus designated generally by the numeral 28 is provided on each of the front and rear frames for lifting and supporting objects on the mobile lift.

More particularly, the front and rear frames 21 and 22 each include spaced upright members 31 and 32 which are interconnected at their upper ends by a cross member 33. Reinforcing gussets 34 are preferably provided at the juncture of the upright members with the cross member. The lower end of the front frame 21 is rigidly attached to the side beams 23 and 24 and for this purpose has a plate 36 attached to the lower end of each of the side members 31 and 32, which plates are bolted or otherwise rigidly secured to the ends of the side beams 23 and 24, respectively. Brace arms 38 are preferably provided and extend from each of the side members 31 and 32 down into engagement with a respective one of the side beams.

The lift is adapted to handle objects of widely different lengths and for this purpose the rear frame 22 is adjustably mounted on the side beams 23 and 24 for movement toward and away from the front frame 21. The lower ends of the side members 31 and 32 of the rear frame are attached to slidable bearing members such as elongated sleeves 39 which slidably receive the side beams 23 and 24. A brace 41 extends between each of the side members 31 and 32 and the respective sleeve 39 to rigidify the same. A locking means, herein shown in the form of a clamp screw 42, is threadedly mounted on each of the sleeves 39 and arranged to engage the respective side beam to lock the sleeves in adjusted position thereon.

The front ground engaging wheels 25 are rotatably mounted on shafts 46 carried by a respective one of the front wheel support brackets, herein shown as U-shaped yokes 47. The front yokes have upwardly extending shafts 47a thereon each mounted for turning movement about an upright axis in bearings 48 secured to the forward ends of the side beams 23 and 24. As is apparent, the axles 46 of each of the wheels 25 are in vertical alignment with the respective side members 31 and 32 of the front frame so that the weight carried by the forward frame is imposed directly on the front wheels 25. The rear wheels 26 are mounted by axles 51 on wheel supporting brackets or yokes 52, which last-mentioned yokes are rigidly secured to the sleeve 39 attached to the lower end of the rear frame 22. The rear yokes 52 are also disposed in alignment with the respective side members 31 and 32 of the rear frame to impose the weight carried by the rear frame directly on the rear ground engaging wheels.

As previously described, provision is made for driving and turning the front wheels 25 of the lift to effect propelling and steering of the same. In accordance with the present invention, the drive for the front wheels includes an auxiliary frame 55 attached to each of the front yokes 47 for turning movement therewith and a drive motor 56 mounted on each auxiliary frame and operatively connected to a respective one of the front wheels 25. The auxiliary frame shown herein includes spaced side rails 57 attached to the depending legs of the front yokes 47 and extending rearwardly therefrom. The drive motors 56 are preferably of the hydraulic type and are adjustably mounted by a base 58 on the auxiliary frames. A stabilizing rod 59 is attached to the front yoke and to the upper end of each of the motors 56. The motors each include a drive sprocket 61 which is connected through a chain 62 to a driven sprocket 63 on the respective one of the front wheel axles 46. A means to be described more fully hereinafter is provided for reversibly controlling the flow of hydraulic fluid to the motors 56 to reversibly drive the mobile lift.

Figure 2:
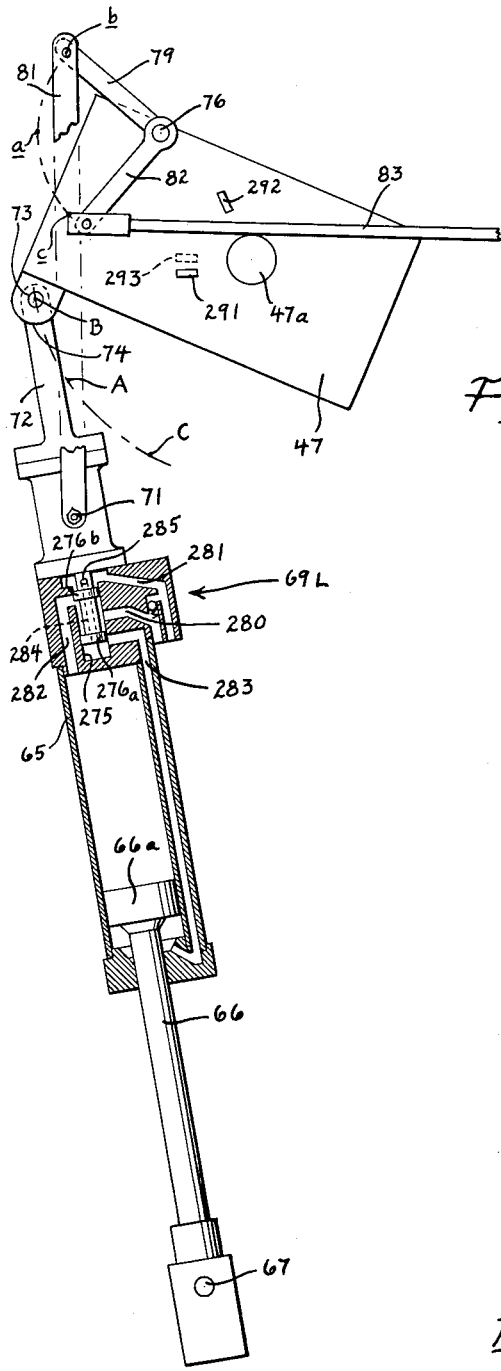
FIG. 2 is a diagrammatic plan view illustrating the steering apparatus during turning of the vehicle.
Figure 2:
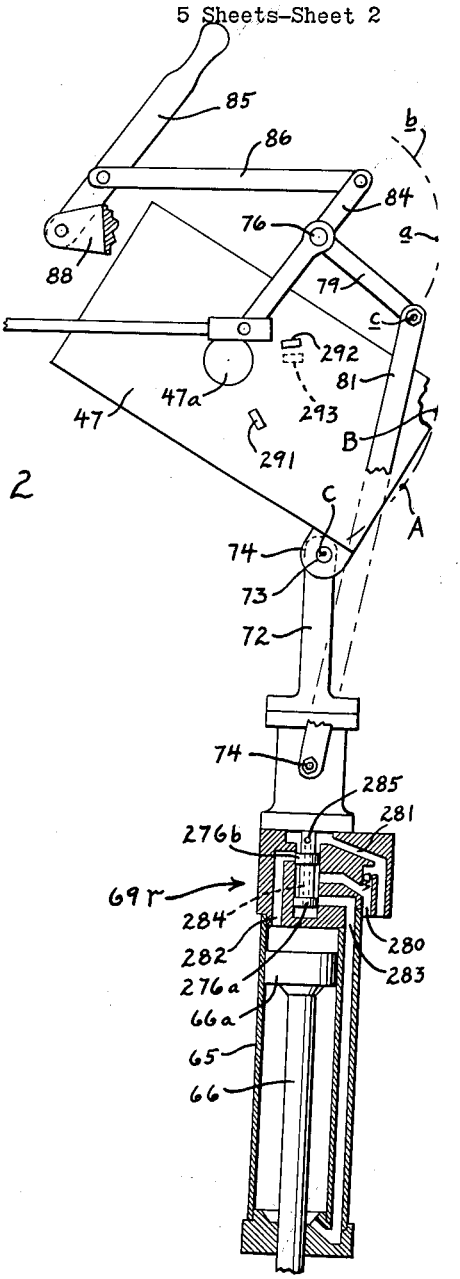
Figure 4:
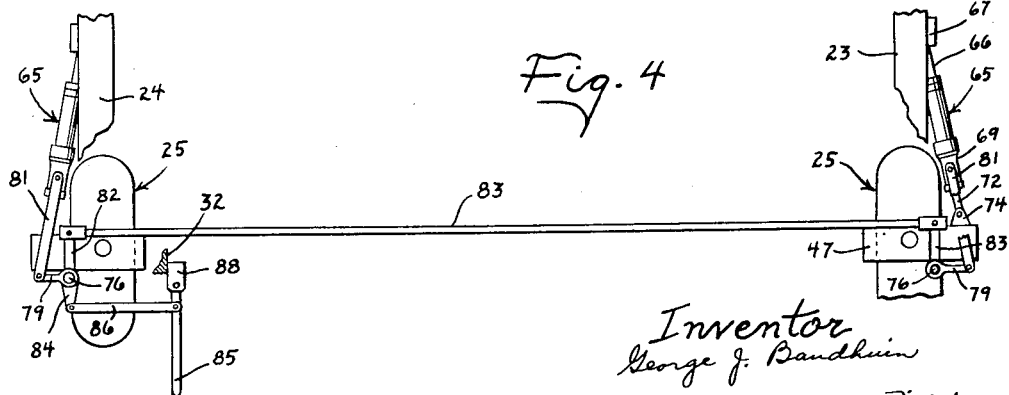
FIG. 4 is a diagrammatic plan view illustrating the steering apparatus in its neutral position.

Steering of the front wheels is preferably effected hydraulically by means of conventional hydraulic steering boosters 60L and 60r such as the Series S23 steering booster manufactured by Vickers Incorporated, Detroit, Michigan, and diagrammatically illustrated in FIGS. 2 and 7. One of these steering boosters is provided for turning each of the front wheel yokes 47 and each includes a cylinder 65 having a piston 66a therein connected to a rod 66 that extends outwardly of one end of the cylinder. The free end of the rod is swively connected by an anchor ball stud 67 to a bracket 68 attached to one of the side beams of the mobile lift. A 4-way control valve 69 is mounted on each of the steering cylinders 65 for movement therewith and has a control ball stud 71 which is movable relative to the control valve from a neutral position shown in FIG. 7 to an "extended" position or "retract" position shown in FIG. 2 at the left and right sides of the vehicle, respectively. The cylinders 65 are connected through a bracket 72 and pivot pin 73 to spaced ears 74 on the respective one of the front steering yokes 47. As best shown in FIGS. 2 and 4, the pivot pins are laterally offset from the pivot axis of the front yokes 47 at the outboard sides of the vehicle so that it is necessary to extend one booster and retract the other booster in order to turn both steering wheels brackets 47 in the same direction.

The steering boosters are so arranged as to effect movement of the hydraulic cylinders 65 in a direction to tend to return the control ball stud 71 to its vertical position relative to the valve 69. More particularly, the control valves 69 each have a valve bore 275 therein, a spool 276 slidable in the bore, and a stem 277 on the spool. The stem is attached to a slidable cage 278 which is connected to the steering ball stud 71 by seats 279 for movement with the stud. The valve has a fluid pressure inlet passage 280, a return passage 281, and front and rear passages 282 and 283 which communicate with the booster cylinder 65 at the front and rear sides of the piston 66a respectively. In addition, an axial passage 284 is formed in the valve spool to pass fluid from the end of the spool through a lateral opening 285 to the return passage 281. The spool lands 276a and 276b are slightly narrower than the valve ports leading to the front and rear passages 282 and 283 and in the neutral position of the valve shown in FIG. 7, permit fluid to flow from the inlet 280 in one path around land 276a through passage 284 and opening 285 to the return passage 281 and also in a second path around land 276b to the return line 281. Thus, in the neutral position of the control valve stem, the fluid in the cylinder 65 at opposite sides of the piston is static and there is no movement of the piston. When the valve spool 276 is extended relative to the valve (as shown on the valve 69L in FIG. 2), fluid under pressure is supplied from the inlet 280 to the front passage 282, and the rear passage 283 is communicated through spool passage 284 and opening 285 to the return line 281 to thereby extend the booster. Conversely, when the spool is retracted relative to the valve (as shown on the valve 69r in FIG. 2), fluid under pressure is supplied from the inlet 280 to the rear passage 283, and the front passage 282 is communicated with the return line 281 to retract the booster.

If movement of the stud 71 is then interrupted, the cylinder 65 will continue to extend or retract until the cylinder moves the control valve relative to its control ball stud a distance sufficient to return the control ball stud to its neutral position. If the stud is continuously drawn toward an extended position, the cylinder 65 will continue movement toward its extended position. Similarly, as the control stud is retracted, the cylinder will retract until the control stud is returned to its neutral position.

The control ball studs 71 on the steering boosters at each side of the mobile lift are operatively interconnected so as to actuate the several steering boosters in synchronism with each other. The linkage for interconnecting the steering boosters is arranged to extend along the upright side members 31 and 32 and cross members 33. More particularly, a pair of upright rods 76 are rotatably journaled in bearings 77 attached to the upright members 31 and 32 and have lower radial arms 79 on the lower ends thereof which are operatively connected by links 81 to the respective control studs 71 on the steering boosters. Upper radial arms 82 are attached to the upper ends of the rods 76 and are operatively interconnected with each other by a tie rod 83 which is pivotally attached to the free ends of the upper arms. A control arm 84 is attached to one of the rods 76, intermediate the ends thereof, and is connected to an operating handle 85 through a linkage 86. As best shown in FIGS. 2 and 4, the operating handle 85 is pivotally mounted by a bracket 88 on the upright side member 32 of the front frame for swinging movement in a horizontal plane.

When the operating handle 85 is positioned to extend longitudinally of the vehicle, the vehicle steering wheels 25 are directed straight ahead as shown in FIG. 4. When the handle 85 is swung to the right or to the left, it operates the respective control valves of the boosters 60L and 60r to turn the wheels respectively to the right and to the left. The boosters 60L and 60r are so arranged as to turn the wheel at the inside of the turn through a relatively greater angle than the wheel at the outside to minimize skidding of the wheels during turning.

For example, when the lever 85 is in its neutral position directed straight ahead, the arms 79 will be positioned at point a and the pivot pins 73 connecting the boosters to the wheel brackets will be located at point A, as shown in FIG. 2. When the lever 85 is moved in one direction such as to the right as shown in FIG. 2, the arms 79 at the right and left sides of the vehicle will be moved through equal arcs to points designated c and b respectively. The arms 79 project in relatively opposite directions from the rods 76 and, when turned, operate the control valves 69 to extend one booster and retract the other booster substantially equal amounts.

As will be noted from FIGS. 2 and 4, the boosters 60L and 60r are mounted in a manner such that the longitudinal axis of the booster defines an angle of more than 90° with a line extending from the pivot pin 73 of the respective booster through the axis of the shaft 47a of the steering bracket. Thus, as one booster is retracted to turn the respective yoke from the neutral position, the pin 73 moves from point A toward point C as shown at the right in FIG. 2, and the angle between the longitudinal axis of the booster and the path of movement of the pivot pin 73 progressively increases. On the other hand, when the booster is extended to turn the respective yoke in the same general direction, the pivot pin 73 will move from point A to point B as shown at the left in FIG. 2, and the path of movement of the pin remains more nearly in alignment with the longitudinal axis of the booster. Therefore, when one booster is retracted and the other extended by a like amount, the wheel bracket connected to the retracted booster will be turned through a greater angle than the wheel bracket connected to the extended booster to thereby turn the inside wheel through a relatively greater angle. Stops 291 and 292 are preferably provided on each of the wheel brackets 47 and cooperate with a stop 293 on the vehicle frame to limit angular movement of the wheel brackets and prevent cramping of the boosters.

A control station is provided on the front frame and includes a platform 91 secured to the front frame adjacent the lower end of the side member 32 to project forwardly of the front frame. A guard rail 92 including upright posts 93 is provided around the platform and a ladder 95 is provided on the front wheel yoke 47 to aid the operator in entering and leaving the platform 91.

A hoist apparatus or winch 28 is provided on each of the front and rear frames 21 and 22 for elevating and lowering objects and for supporting the objects during transportation thereof. Each of the winches 28 includes a pair of drums 101 and 102 which are operated together and are mounted on winch mounting brackets 104 and 107 attached to each of the frames 21 and 22, at opposite sides thereof. A sprocket 108 is attached to one end of each of the drum shafts and is operatively connected through a chain 109 to the drive sprocket 111 of a speed reducer 112. The speed reducer 112 and the hydraulic drive motor 113 therefor are conveniently attached to a platform 114 which is pivotally mounted on the bracket 107 for vertical pivotal movement about an axis eccentric to the axis of the drum shaft so as to thereby permit tensioning of the drive chain 109.

Each of the winches is arranged to operate a pair of cables 118 and 119 which are suspended from the upper end of the frame and adjacent opposite sides thereof and carry pulley blocks 121 and 124 respectively. The cables are wound on the respective drums 101 and 102 in such a manner as to simultaneously raise or lower the respective pulley blocks 124 and 121 in unison with each other as the drums 101 and 102 are rotated.

Hydraulic fluid is supplied to the several drive motors, hoist motors and steering boosters from a common pump and reservoir assembly on the mobile lift and, as best shown in FIGS. 1 and 5, a reservoir 131 is mounted on the side beam 24 by brackets 132. A prime mover such as an internal combustion engine 133 is also mounted on the side beam 24 and in such a manner as to not obstruct the free open space between the side beams. The motor 133 is arranged to drive the hydraulic pumps for operating the several hydraulic motors and, in accordance with the present invention, a pair of pumps designated 134 and 135 are operatively connected to the motor 133 to be driven thereby. The pumps 134 and 135 respectively include suction lines 136 and 137 which communicate with the reservoir 131 and delivery lines 138 and 139. The hydraulic circuit for operatively connecting the pumps to the several motors is diagrammatically shown in FIG. 8 and, for convenience, the drive motors for the left and right sides of the mobile lift are designated respectively by the numerals 56*l* and 56*r* and the hoist motors 113 for the front and rear frames are designated by the letters 113*f* and 113*r* respectively. The valves 69 on the hydraulic steering boosters for the left and right hand sides of the mobile lift are respectively designated by the letters 69*l* and 69*r*.

Control valves 141*a* and 141*b* are provided for controlling the flow of fluid to and from the drive motors 56*l* and 56*r* and control valves 142*a* and 142*b* are provided for controlling the flow of fluid to and from the hoist motors 113*f* and 113*r* respectively. The valves 141*a* and 141*b* are conventional four-way valves and include an operator 143. Similarly, the valves 142*a* and 142*b* are four-way valves having an operator 144. The drive motors 56*l* and 56*r* may conveniently be operated in unison, and, as diagrammatically shown in FIG. 6, a common operating lever 146 is mounted on the valve casing and connected to the operators 143 of the valves 141*a* and 141*b*. The hoist motors 113*f* and 113*r* are preferably independently operated as by levers 147 and 148 also mounted on the valve casings and connected to the operators 144 of valves 142*a* and 142*b* respectively.

In order to utilize both pumps 134 and 135 during driving of the lift, the valves 141*a* and 141*b* are respectively connected through conduits 151 and 152 to the delivery conduits 139 and 138 of pumps 135 and 134. The valves 141*a* and 141*b* are also connected through conduits 153 and 154 to the return line 155 leading to the reservoir 131. Fluid from pump 135 is thus reversibly supplied through valve 141A and conduits 156 and 157 to the drive motor 56*l* and fluid from pump 134 is supplied through valve 141*b* and conduits 158 and 159 to the other drive motor 56*r*.

Both pumps are similarly used during hoisting operations and for this purpose the valves 142*a* and 142*b* are connected through conduits 161 and 162 to the delivery conduits 139 and 138. These valves are otherwise connected through conduits 163 and 164 to the return conduit 155. Control valve 142*a* is connected to the hoist motor 113*f* at the front of the lift through conduits 165 and 166 and the valve 142*b* is connected through conduits 167 and 168 to the hoist motor 113*r* at the rear of the lift. Fluid under pressure from conduit 139 is also supplied through conduit 171 to the valve 69*r* on the right steering booster, which valve is otherwise connected to the return line through conduit 172. Fluid under pressure from supply conduit 138 is supplied through conduit 173 to the valve 69*l* on the left steering booster, which valve is otherwise connected through conduit 174 to the reservoir 131. In order to prevent the build-up of back pressure at the steering valve outlets 281, the return lines 172 and 174 are made relatively large to reduce the flow impedance of the lines.

The aforedescribed conduits which interconnect the pumps, motors and valves are arranged to extend alongside the side beams and main frames so as to not obstruct the generally open arch structure formed thereby. However, in order to simplify the drawings, the several hydraulic conduits have not been illustrated. In general, the conduits 158 and 159 leading from the valve 141*b* to the left drive motor 56*l* extend alongside the upright and cross members of the front frame 21 as do the conduits 173 and 174 leading to the valve 69*l* on the left steering booster. The conduits for the rear hoist motor 113*r* extend from the valve 142*b* alongside the beam 24 and thence upwardly along the rear frame 22.

Figure 3:
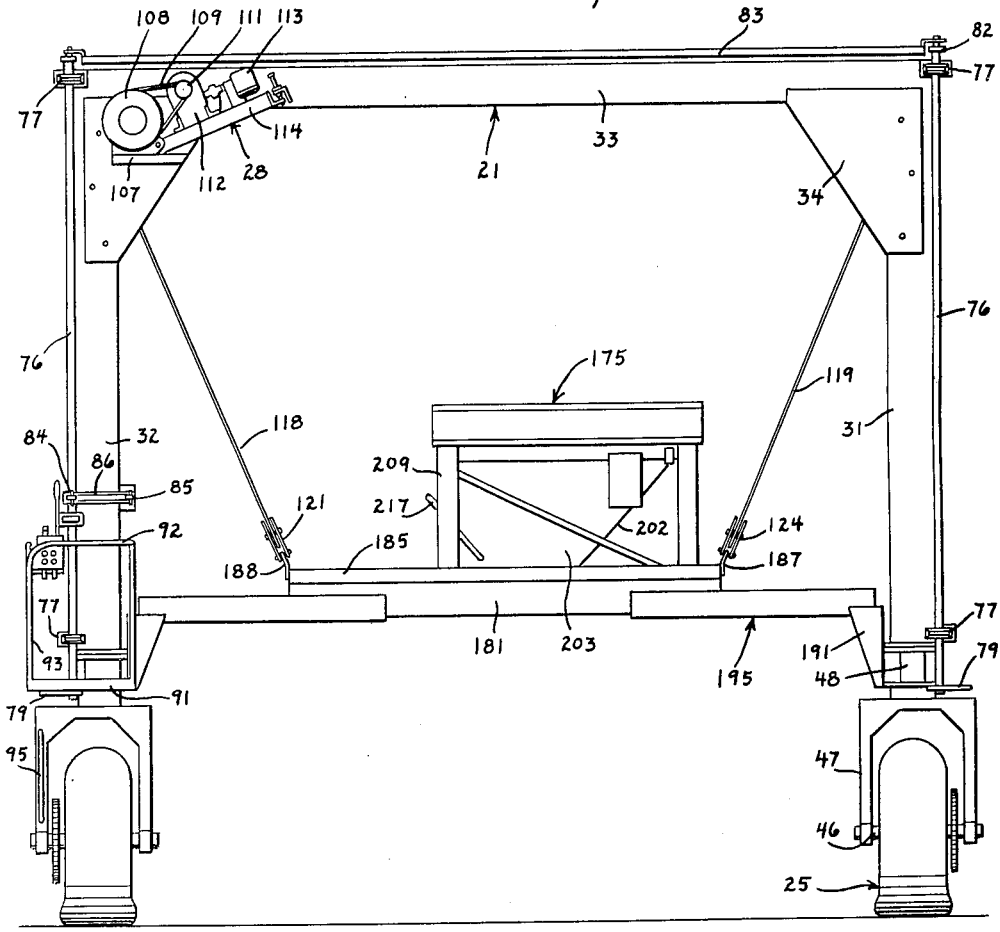
FIG. 3 is a front end view of the vehicle.

The mobile lift as shown herein is particularly adapted for use in the forming and handling of concrete beams and as shown in FIG. 3 is provided with a hopper apparatus designated generally by the numeral 175 which is arranged to be lifted and transported by the mobile lift. In general, the hopper apparatus includes a frame 181 having an operator's platform along one side thereof. A hopper having side and end walls 202 and 203 is supported by legs 209 on the frame 181. A discharge valve is provided at the lower end of the hopper and is selectively operated by a lever 217. Brackets 187 and 188 are secured to opposite ends of the frame for attachment to the pulley blocks 124 and 121 respectively to enable elevating and lowering of the hopper by the hoist winches. Shoes 195 are provided on the hopper frame and arranged to be received in saddles 191 and 192 on the lift vehicle to support the hopper in its raised position.

The mobile lift may thereafter be used to remove the forms and to also transport the finished beam to the desired location. As shown in FIG. 1, a pair of rails 225 and 226 are provided, which rails have brackets 227 and 228 respectively at opposite ends thereof to receive the pulley blocks 121 and 124. With this arrangement, the rails 225 and 226 are vertically adjustably supported by the cables 118 and 119 at each the front and rear frames 21 and 22. One or more transversely movable carriages 231 are provided on each of the rails 225 and 226 for movement therealong in a direction transversely of the mobile lift. The carriages herein shown are of the so-called geared-type having an operating wheel 234 which is adapted upon rotation to drive the carriage in one way or the other along the respective rail. As is apparent, the hooks 235 on the carriage can be connected to the forms for the concrete beam, to facilitate moving the same upwardly and outwardly during removal thereof, and also can be connected to the beam 241 itself as shown in FIG. 1 to elevate and transport the same.

I claim:

1. In combination with a gantry-type vehicle having spaced sides and a connecting bridge portion extending between the sides adjacent the upper end and defining a generally U-shaped frame structure for straddling objects, a set of wheel mounting brackets on each side of the vehicle, at least one bracket of each set being a steering wheel bracket mounted for turning movement about an upright axis, wheels mounted in each of the brackets for supporting the vehicle, a pair of pressure responsive devices each connected to one of the steering wheel brackets to effect turning of the respective steering bracket, a pair of control valves each located adjacent one of the steering wheel brackets and connected to a respective one of the pressure responsive devices for reversibly controlling the flows of fluid thereto, means connecting said control valves to the respective steering wheel bracket for movement in a direction and magnitude correlative with the turning movement of the steering wheel bracket, said control valves each including a valve operator movable relative to the valve in opposite directions from a neutral position to reversibly supply fluid to the respective pressure responsive device, and linkage means extending upwardly along the sides and crosswise of the vehicle along the bridge portion thereof and interconnecting said valve operators to effect turning of the steering wheel brackets in controlled relation to each other.

2. The combination of claim 1 wherein said linkage means includes an upright rod rotatably mounted at each side of the vehicle and having lateral arms at the upper and lower ends thereof, a tie bar connecting the arms at the upper end of the rods, means connecting the arms at the lower ends of the rods to the valve operators at the respective sides of the vehicle, and a manually operable steering lever connected to the linkage means at one side of the vehicle.

3. In combination with a gantry-type vehicle having spaced sides and a connecting bridge portion extending between the sides adjacent the upper end and defining a generally U-shaped frame structure for straddling objects, a set of wheel mounting brackets on each side of the vehicle, at least one bracket of each set being a steering wheel bracket mounted for turning movement about an upright axis, wheels mounted in each of the brackets for supporting the vehicle, a pair of hydraulic steering boosters, each including a cylinder, a piston in said cylinder and a control valve connected to the cylinder for movement therewith and for reversibly controlling the flow of fluid to the cylinder, means pivotally connecting the cylinder and valve of each booster to a respective one of the steering wheel brackets at a point spaced horizontally from the pivot axis thereof, means connecting the pistons of said booster to the respective side of the vehicle to effect turning of the steering wheel brackets in response to extension and retraction of said boosters, said control valves each including a valve operator movable relative to the valve in opposite directions from a neutral position to reversibly control the flow of fluid to the respective cylinder, linkage means extending upwardly along the sides and crosswise of the vehicle along the bridge portion thereof and interconnecting said valve operators to effect turning of the steering wheel brackets in controlled relation to each other.

4. In combination with a gantry-type vehicle having spaced sides and a connecting bridge defining a generally U-shaped frame and a pair of wheel support brackets mounted on said frame at opposite sides of the vehicle for turning movement about an upright axis, a pair of hydraulic steering boosters each including a cylinder, a piston in the cylinder, and a control valve connected to the cylinder for movement therewith and for reversibly controlling the flows of fluid to the respective cylinder, means pivotally connecting the cylinder and valve of each booster to a respective one of the steering wheel brackets at a point spaced horizontally from the pivot axis thereof, means pivotally connecting each piston rod to the frame of the vehicle to effect turning of the wheel brackets in response to extension and retraction of the boosters, said control valves each including a valve operator movable relative to the valve in opposite directions from a neutral position to reversibly control the flows of fluid to the respective cylinder, and linkage means extending upwardly along the sides and crosswise along the bridge of the frame for connecting said valve operators at opposite sides of the vehicle to effect turning of the steering wheel brackets in controlled relation to each other.

5. In combination with a gantry-type vehicle having spaced sides and a connecting bridge defining a generally U-shaped frame and a pair of wheel support brackets mounted on said frame at opposite sides of the vehicle for turning movement about an upright axis, a pair of hydraulic steering boosters each including a cylinder, a piston in the cylinder, and a control valve connected to the cylinder for movement therewith and for reversibly controlling the flows of fluid to the respective cylinder, means pivotally connecting the cylinder and valve of each booster to a respective one of the steering wheel brackets at a point spaced horizontally from the pivot axis thereof, means pivotally connecting each piston rod to the frame of the vehicle to effect turning of the wheel brackets in response to extension and retraction of the boosters, said control valves each including a valve operator movable relative to the valve in opposite directions from a neutral position to reversibly control the flows of fluid to the respective cylinder, linkage means connecting said valve operators at opposite sides of the vehicle to effect turning of the steering wheel brackets in controlled relation to each other, said linkage means including an upright steering shaft mounted at each side of the vehicle for rotation about an axis parallel to the pivot axis of the wheel bracket at that side of the vehicle, first and second arms on each shaft, a tie bar extending crosswise of the vehicle and pivotally connected to said first arms at each side of the vehicle, and means connecting said second arms at each side of the vehicle to the valve operator at that side of the vehicle.

6. The combination of claim 5 including a manually operable steering lever mounted for turning about an upright axis, and means operatively connecting said lever to the steering shaft at one side of the vehicle to turn the latter.

7. The combination of claim 6 wherein said lever is movable from a neutral position, paralleling the longitudinal axis of the vehicle when the wheel brackets are positioned for straight ahead movement of the vehicle, selectively to the left and to the right, said linkage means moving said valve operators in a direction and distance correlative with the direction and amplitude of movement of said steering lever from its neutral position whereby the angular position of said wheel brackets is correlative with the angular position of said lever.

8. In combination with a vehicle having spaced sides and a connecting bridge portion extending between said sides adjacent their upper ends and defining a generally U-shaped frame structure for straddling objects, a steering wheel bracket mounted on each side of the frame for turning movement about an upright axis, a second wheel bracket on each side of the vehicle, wheels journalled in said brackets for supporting the vehicle, a pair of pressure operated devices each including a cylinder element and a piston element movable relative to each other from a neutral position, pivot means connecting one element of each pressure responsive device to one of the steering wheel brackets at a point spaced from said upright axis thereof and located at the outboard side of the pivot axis whereby simultaneous extension of one pressure operated device and retraction of the other pressure operated device from its neutral position will turn the steering wheel brackets in the same general direction, means pivotally connecting the other element of each pressure responsive device to a respective one of the sides of the frame at a point at which the longitudinal axis of the pressure operated device will extend at an angle of more than 90° with respect to a line from said pivot means to the upright axis of the respective steering bracket when the latter is positioned for straight ahead movement whereby the operators turn the respective steering wheel bracket through a greater distance when retracted a preselected distance from their neutral position than when extended a similar distance, and means operatively interconnecting the fluid operators at opposite sides of the vehicle to effect simultaneous substantially equal movement of the operators in relatively opposite directions.

References Cited in the file of this patent

UNITED STATES PATENTS

| | | |
|---|---|---|
| 1,209,209 | Ross | Dec. 19, 1916 |
| 1,480,257 | Gerlinger | Jan. 8, 1924 |
| 2,191,961 | Howell | Feb. 27, 1940 |
| 2,410,965 | Dimick | Nov. 12, 1946 |
| 2,412,755 | Sloane | Dec. 17, 1946 |
| 2,487,618 | Twyman | Nov. 8, 1949 |
| 2,512,979 | Strother | June 27, 1950 |
| 2,567,074 | Kupiec | Sept. 4, 1951 |
| 2,708,344 | Greer | May 17, 1955 |